(12) United States Patent
Engelfried et al.

(10) Patent No.: US 9,744,606 B2
(45) Date of Patent: Aug. 29, 2017

(54) POWER CUTTING TOOL (71) Applicant: Robert Bosch GmbH, Stuttgart (DE)

(72) Inventors: Uwe Engelfried, Ostfildern (DE); Petr Grulich, Kirchheim/Teck (DE); Thomas Duerr, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 167 days.

(21) Appl. No.: 14/410,077

(22) PCT Filed: May 14, 2013

(86) PCT No.: PCT/EP2013/059921
§ 371 (c)(1),
(2) Date: Dec. 20, 2014

(87) PCT Pub. No.: WO2014/000949
PCT Pub. Date: Jan. 3, 2014

(65) Prior Publication Data
US 2015/0321376 A1   Nov. 12, 2015

(30) Foreign Application Priority Data

Jun. 28, 2012 (DE) .................. 10 2012 211 087

(51) Int. Cl.
*B27B 17/02* (2006.01)
*B23D 57/02* (2006.01)
*B23D 59/00* (2006.01)

(52) U.S. Cl.
CPC ......... *B23D 59/001* (2013.01); *B23D 57/023* (2013.01); *B27B 17/02* (2013.01)

(58) Field of Classification Search
CPC ...... B27B 17/02; B23D 57/023; B23D 59/001
See application file for complete search history.

(56) References Cited

U.S. PATENT DOCUMENTS

| 3,810,309 | A |   | 5/1974  | Wiklund et al. |           |
|-----------|---|---|---------|----------------|-----------|
| 4,316,327 | A |   | 2/1982  | Scott et al.   |           |
| 4,355,551 | A |   | 10/1982 | Kolleas        |           |
| 4,382,334 | A |   | 5/1983  | Reynolds       |           |
| 4,819,335 | A | * | 4/1989  | Alexander      | B27B 17/14 |
|           |   |   |         |                | 30/122    |
| 5,396,705 | A |   | 3/1995  | Leini          |           |
| 5,528,835 | A | * | 6/1996  | Ra             | B27B 17/14 |
|           |   |   |         |                | 30/383    |

(Continued)

FOREIGN PATENT DOCUMENTS

DE    10 2010 043 182 A1    5/2012
EP       2 460 623 A2       6/2012

OTHER PUBLICATIONS

International Search Report corresponding to PCT Application No. PCT/EP2013/059921, mailed Aug. 16, 2013 (German and English language document) (7 pages).

*Primary Examiner* — Hwei C Payer
(74) *Attorney, Agent, or Firm* — Maginot, Moore & Beck LLP (57) ABSTRACT A power cutting tool includes at least one cutting strand, and at least one guide unit that is configured to guide the cutting strand. The power cutting tool further includes at least one coding unit which has at least one coding element that is configured to encode at least one coupling interface of the guide unit.

10 Claims, 3 Drawing Sheets (56) References Cited

U.S. PATENT DOCUMENTS

| | | | |
|---|---|---|---|
| 9,010,454 B2* | 4/2015 | Neubauer | B23D 59/001 173/176 |
| 2006/0159533 A1 | 7/2006 | Zeiler et al. | |
| 2012/0138322 A1 | 6/2012 | Neubauer et al. | |
| 2015/0321376 A1* | 11/2015 | Engelfried | B23D 59/001 30/383 |

* cited by examiner

POWER CUTTING TOOL

This application is a 35 U.S.C. §371 National Stage Application of PCT/EP2013/059921, filed on May 14, 2013, which claims the benefit of priority to Serial No. DE 10 2012 211 087.9, filed on Jun. 28, 2012 in Germany, the disclosures of which are incorporated herein by reference in their entirety.

BACKGROUND

There are already known power-tool parting devices that have a cutting strand, and that have a guide unit for guiding the cutting strand.

SUMMARY

The disclosure is based on a power-tool parting device, in particular a hand power-tool parting device, having at least one cutting strand, and having at least one guide unit for guiding the cutting strand.

It is proposed that the power-tool parting device comprise at least one coding unit, which has at least one coding element provided to code at least one coupling interface of the guide unit. Preferably, the coding element is realized symmetrically in relation to a longitudinal axis of the coding element. It is also conceivable, however, for the coding element to be realized asymmetrically in relation to the longitudinal axis of the coding element. A "cutting strand" is to be understood here to mean, in particular, a unit provided to locally undo an atomic coherence of a workpiece on which work is to be performed, in particular by means of a mechanical parting-off and/or by means of a mechanical removal of material particles of the workpiece. Preferably, the cutting strand is provided to separate the workpiece into at least two parts that are physically separate from each other, and/or to part off and/or remove, at least partially, material particles of the workpiece, starting from a surface of the workpiece. Particularly preferably, the cutting strand is moved in a revolving manner, in particular along a circumferential direction of a guide unit of the power-tool parting device, in at least one operating state. Particularly preferably, the cutting strand is realized as a cutting chain. It is also conceivable, however, for the cutting strand to be of another design, considered appropriate by persons skilled in the art, such as, for example, designed as a cutting band, on which a plurality of cutting strand segments of the cutting strand are disposed. Preferably, the cutting strand, as viewed along a direction that is at least substantially perpendicular to a cutting plane of the cutting strand, has a maximum dimension of less than 4 mm. Preferably, the dimension is realized as the width of the cutting strand. Particularly preferably, the cutting strand, as viewed along the direction that is at least substantially perpendicular to the cutting plane of the cutting strand, has a maximum dimension that is at least substantially constant along a total length of the cutting strand. Preferably, along the total length of the cutting strand, the maximum dimension corresponds to a value from a value range of from 1 mm to 3 mm. Consequently, the power-tool parting device, as viewed along a total extent of the power-tool parting device, has a total width of less than 4 mm. The cutting strand is thus preferably provided to produce a cut that has a maximum dimension of less than 4 mm, as viewed along the direction that is at least substantially perpendicular to the cutting plane of the cutting strand.

A "guide unit" is to be understood here to mean, in particular, a unit provided to exert a constraining force upon the cutting strand, at least along a direction perpendicular to a cutting direction of the cutting strand, in order to define a movement capability of the cutting strand along the cutting direction. Preferably, the guide unit has at least one guide element, in particular a guide groove, by which the cutting strand is guided. Preferably, the cutting strand, as viewed in a cutting plane, is guided by the guide unit along an entire circumference of the guide unit, by means of the guide element, in particular the guide groove. Particularly preferably, the cutting strand and the guide unit form a closed system. The term "closed system" is intended here to define, in particular, a system comprising at least two components that, by means of combined action, when the system has been demounted from a system that is of a higher order than the system, such as, for example, a power tool, maintain a functionality and/or are inseparably connected to each other when in the demounted state. Preferably, the at least two components of the closed system are connected to each other so as to be at least substantially inseparable by an operator. "At least substantially inseparable" is to be understood here to mean, in particular, a connection of at least two components that can be separated from each other only with the aid of parting tools such as, for example, a saw, in particular a mechanical saw, etc. and/or chemical parting means such as, for example, solvents, etc.

The expression "coding unit" is intended here to define, in particular, a unit provided to mechanically, electrically and/or electronically encode a coupling interface of the power-tool parting device, in particular according to a key-and-keyhole principle. Preferably, the coding unit is provided to render the guide unit, or the power-tool parting device, mountable on components having a shape that corresponds to the encoded coupling interface, in particular a shape for decoding the coded coupling interface. In addition, the coding unit is preferably provided to prevent the guide unit, or the power-tool parting device, from being mountable on components having a shape that differs from the encoded coupling interface, in particular a shape that is unsuitable for decoding the encoded coupling interface. Moreover, the coding unit is preferably provided to predetermine a coupling position of the power-tool parting device, in particular an alignment of the power-tool parting device relative to a coupling device of a portable power tool, by means of the coding element. "Provided" or "configured" is to be understood here to mean, in particular, specially designed, specially equipped and/or specially programmed. Advantageously, by means of the design of the power-tool parting device according to the disclosure, incorrect coupling of the power-tool parting device to a coupling device of a portable power tool can be prevented. Moreover, it is advantageously possible to prevent the power-tool parting device from being coupled to a coupling device of a portable power tool that is dissociated from a decoding element that corresponds to the coding element, in order, for example, to avoid coupling of the power-tool parting device to a coupling device of a portable power tool that is over-dimensioned in respect of a drive power for driving the cutting strand.

Furthermore, it is proposed that, for the purpose of coding the coupling interface, the coding element extends at least substantially parallelwise in relation to a cutting plane of the cutting strand. "Substantially parallelwise" is to be understood here to mean, in particular, an alignment of a direction relative to a reference direction, in particular in one plane, the direction deviating from the reference direction by, in particular, less than 8°, advantageously less than 5°, and particularly advantageously less than 2°. Preferably, the coding element extends at least substantially parallelwise in relation to an outer face of the guide unit. The term "cutting plane" is intended here to define, in particular, a plane in which the cutting strand is moved, in at least one operating state, for the purpose of performing work on a workpiece. Preferably, the cutting strand is moved in at least two mutually opposing cutting directions in the cutting plane, along a circumference of the guide unit, relative to the guide unit. Preferably, when work is being performed on a workpiece, the cutting plane is aligned at least substantially transversely in relation to a workpiece surface on which work is to be performed. "At least substantially transversely" is to be understood here to mean, in particular, an alignment of a plane and/or of a direction, relative to a further plane and/or a further direction, that is preferably other than a parallel alignment of the plane and/or of the direction relative to the further plane and/or the further direction. However, it is also conceivable that, when work is being performed on a workpiece, the cutting plane is aligned at least substantially parallelwise in relation to a workpiece surface on which work is to be performed, in particular if the cutting strand is in the form of an abrasive means. The design according to the disclosure makes it possible, advantageously, to achieve a compact design of the power-tool parting device in respect of a width of the power-tool parting device extending at least substantially perpendicularly in relation to the outer face of the guide unit.

Advantageously, the coding element, as viewed in a cutting plane of the cutting strand, projects axially beyond the guide unit. Preferably, the coding element projects axially beyond the guide unit, along a middle axis of the guide unit. Thus, particularly advantageously, it is possible to achieve a coding element that has a rotational-force support function in addition to a coding function.

Furthermore it is proposed, that the coding element, at least in a partial region, as viewed along a direction that is at least substantially parallel to a cutting plane of the cutting strand, has a greater maximum width extent than a maximum width extent of the guide unit and/or of the cutting strand. The maximum width extent of the coding element preferably extends at least substantially perpendicularly in relation to a longitudinal axis of the coding element. In addition, the maximum width extent of the guide unit and/or of the cutting strand extends at least substantially perpendicularly in relation to a longitudinal axis of the guide unit. In particular, a ratio of the maximum width extent of the guide unit and/or of the cutting strand to the maximum width extent of the coding element is greater than/equal to 0.3, preferably greater than/equal to 0.4, and particularly preferably greater than 0.5. In this case, the partial region of the coding element in which the coding element has the maximum width extent may be square, circular, elliptical, etc. in form. Advantageously, by means of the design according to the disclosure, contact protection can additionally be achieved by the coding element, at least in a partial region.

It is additionally proposed that, for the purpose of coding the coupling interface, the coding element extends at least substantially transversely in relation to the cutting plane of the cutting strand. Preferably, for the purpose of coding the coupling interface, the coding element extends at least substantially perpendicularly in relation to the cutting plane of the cutting strand. The expression "substantially perpendicularly" is intended here to define, in particular, an alignment of a direction relative to a reference direction, the direction and the reference direction, in particular as viewed in one plane, enclosing an angle of 90°, and the angle having a maximum deviation of, in particular, less than 8°, advantageously less than 5°, and particularly advantageously less than 2°. Moreover, the coding element may additionally extend at least substantially parallelwise in relation to the cutting plane. By means of an at least substantially perpendicular extent of the coding element it is possible, advantageously, to realize a form-closed connection that prevents the power-tool parting device, or the guide unit, in a with a coupling device of a portable power tool, from being moved along a direction that is at least substantially parallel to the cutting plane.

Moreover, it is proposed that the coding element be realized as an extension that, at least in a partial region, as viewed along a direction that is at least substantially perpendicular to the cutting plane of the cutting strand, has a greater maximum thickness extent than a maximum thickness extent of the guide unit and/or of the cutting strand. Preferably, the coding element is realized as a longitudinal extension that extends at least substantially parallelwise in relation to the cutting plane. Preferably, the maximum thickness extent of the extension is aligned symmetrically in relation to the cutting plane. In particular, the ratio between the maximum thickness extent of the coding element and the maximum thickness extent of the guide unit and/or of the cutting strand is greater than 0.16, preferably greater than 0.2, and particularly preferably greater than 0.5. Preferably, the coding unit, as viewed along a direction that is at least substantially perpendicular to the cutting plane of the cutting strand, has a greater maximum thickness extent than a maximum thickness extent of the guide unit and/or of the cutting strand. A coding element can be realized by simple design means. Moreover, advantageously, it is possible to prevent damage to a coupling device of the power tool as a cutting strand revolves around a circumference of the guide unit. In addition, it is thus advantageously possible to achieve a broad spectrum of application in respect of cutting strands of differing thicknesses on the guide unit on which the coding element is disposed.

Furthermore, it is proposed that the coding element be realized as an extension that, at least in a partial region, as viewed along a direction that is at least substantially perpendicular to a cutting plane of the cutting strand, has a lesser maximum thickness extent than a maximum thickness extent of the guide unit and/or of the cutting strand. Thus, advantageously, a thin, compact coding element can be realized.

It is additionally proposed that the coding element, as viewed in a cutting plane of the cutting strand, extend at least substantially transversely in relation to a central axis of the guide unit. The coding element in this case is preferably disposed asymmetrically in relation to the central axis, on the guide unit. The expression "central axis of the guide unit" is intended here to define, in particular, an axis that extends through the guide unit, at least substantially parallelwise in relation to an outer face of the guide unit, and in relation to which the guide unit is preferably symmetrical. Preferably, the coding element is disposed on the guide unit, in the region of a drive side of the guide unit. A "drive side" is to be understood here to mean, in particular, a side of the guide unit on which a drive element of the portable power tool can be coupled to the cutting strand and/or to a torque transmission element of the power-tool parting device, and, in particular, engages in the guide unit, for the purpose of transmitting driving forces and/or drive torques to the cutting strand when the power-tool parting device, in particular the guide unit, has been connected to the coupling device of a portable power tool. Advantageously, by means of the design according to the disclosure, a coupling position of the power-tool parting device, or of the guide unit, can be predefined by means of the coding element, in addition to coding of the coupling interface.

It is additionally proposed that the coding unit have at least one electronic code transmission unit. Preferably, as the power-tool parting device, or the guide unit, approaches a coupling device of a portable power tool, the electronic code transmission unit automatically transmits a code that is read out by an electronic readout unit of the portable power tool, by means of electromagnetic waves. It is also conceivable, however, for the coding unit to be of another design, considered appropriate by persons skilled in the art, such as, for example, designed as a hologram coding unit, which has a coding element, realized as a hologram, that can be read out by an electronic readout unit of the portable power tool. This makes it possible, particularly advantageously, to achieve secure coding of the coupling interface.

Advantageously, the coding element is realized as an RFID chip. It is also conceivable, however, for the coding element to be of another design, considered appropriate by persons skilled in the art. The design according to the disclosure makes it possible to achieve coding of the coupling interface in a particularly inexpensive and space-saving manner.

The disclosure is additionally based on a portable power tool comprising a coupling device for form-closed and/or force-closed coupling to a power-tool parting device according to the disclosure. A "portable power tool" is to be understood here to mean, in particular, a power tool, in particular a hand power tool, that can be transported by an operator without the use of a transport machine. The portable power tool has, in particular, a mass of less than 40 kg, preferably less than 10 kg, and particularly preferably less than 5 kg. Particularly preferably, the power-tool parting device according to the disclosure and the portable power tool according to the disclosure form a power tool system. Preferably, the portable power tool has a decoding unit that corresponds to the coding unit and that has at least one decoding element that acts in combination with the coding element of the coding unit. It can be ensured, advantageously, that the coupling device can be coupled only to suitable power-tool parting devices that are intended for operation with the portable power tool. Moreover, advantageously, it is possible to achieve a portable power tool that is suitable, particularly advantageously, for a broad spectrum of application.

The power-tool parting device according to the disclosure, the portable power tool according to the disclosure and/or the power tool system according to the disclosure is/are not intended in this case to be limited to the application and embodiment described above. In particular, the power-tool parting device according to the disclosure, the portable power tool according to the disclosure and/or the power tool system according to the disclosure may have individual elements, components and units that differ in number from a number stated herein, in order to fulfill a principle of function described herein.

BRIEF DESCRIPTION OF THE DRAWINGS

Further advantages are given by the following description of the drawing. The drawing shows exemplary embodiments of the disclosure. The drawing, the description and the claims contain numerous features in combination. Persons skilled in the art will also expediently consider the features individually and combine them to create appropriate further combinations.

There are shown in the drawing.

DETAILED DESCRIPTION

Figure 1:
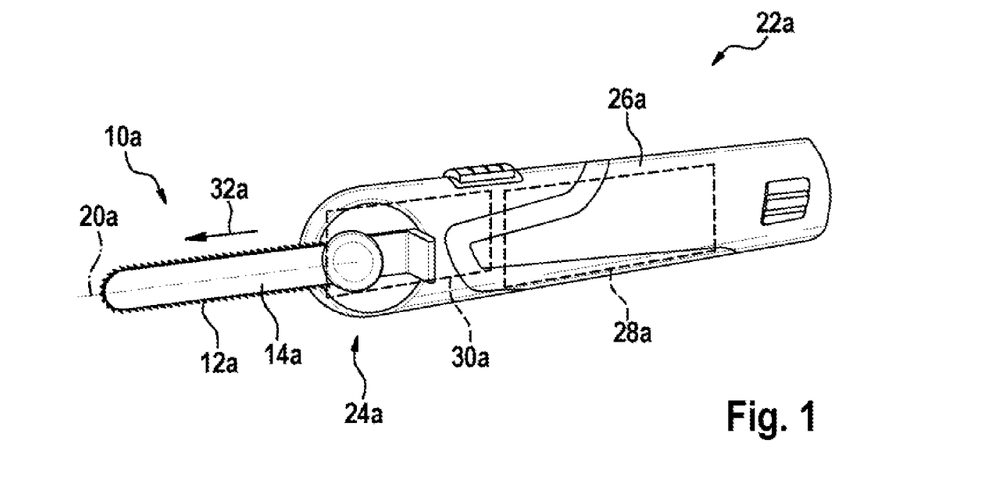
FIG. 1 a portable power tool according to the disclosure having a power-tool parting device according to the disclosure, in a schematic representation, FIG. 2 a detail view of the power-tool parting device according to the disclosure, having a coding unit comprising a coding element that is at least substantially parallel to a cutting plane, in a schematic representation, FIG. 3 a detail view of an alternative power-tool parting device according to the disclosure, having a coding unit comprising a coding element that is at least substantially perpendicular to a cutting plane, in a schematic representation, FIG. 4 a detail view of a further, alternative power-tool parting device according to the disclosure, having a coding unit comprising a coding element that is at least substantially transverse in relation to a central axis of a guide unit of the further, alternative power-tool parting device according to the disclosure, in a schematic representation, FIG. 5 a detail view of a further, alternative power-tool parting device according to the disclosure, having an electronic coding unit, in a schematic representation, FIG. 6 a detail view of a further, alternative power-tool parting device according to the disclosure, in a schematic representation, and FIG. 7 a detail view of a further, alternative power-tool parting device according to the disclosure, in a schematic representation.

FIG. 1 shows a portable power tool 22a comprising a power-tool parting device 10a, which together form a power tool system. The power-tool parting device 10a comprises at least one cutting strand 12a and at least one guide unit 14a for guiding the cutting strand 12a. The portable power tool 22a has a coupling device 24a for coupling the power-tool parting device 10a in a form-closed and/or force-closed manner. The coupling device 24a in this case may be realized as a bayonet closure and/or as another coupling device considered appropriate by persons skilled in the art. The portable power tool 22a additionally has a power tool housing 26a, which encloses a drive unit 28a and a transmission unit 30a of the portable power tool 22a. The drive unit 28a and the transmission unit 30a are operatively connected to each other for the purpose of generating a drive torque that can be transmitted to the power-tool parting device 10a, in a manner already known to persons skilled in the art. The transmission unit 30a is realized as a bevel gear transmission. The drive unit 28a is realized as an electric motor unit. It is also conceivable, however, for the drive unit 28a and/or the transmission unit 30a to be of a different design, considered appropriate by persons skilled in the art. The drive unit 28a is provided to drive the cutting strand 12a of the power-tool parting device 10a, in at least one operating state, via the transmission unit 30a. The cutting strand 12a in this case is moved in the guide unit 14a of the power-tool parting device 10a, along a cutting direction 32a of the cutting strand 12a in the guide unit 14a. For the purpose of driving the cutting strand 12a, the transmission unit 30a of the portable power tool 22a has a torque transmission element (not represented in greater detail here), which can be coupled to the cutting strand 12a for the purpose of transmitting forces and/or torques to the cutting strand 12a. It is also conceivable, however, for the power-tool parting device 10a to have a torque transmission element that is rotatably mounted on the guide unit 14a and engages in the cutting strand 12a.

Figure 2:
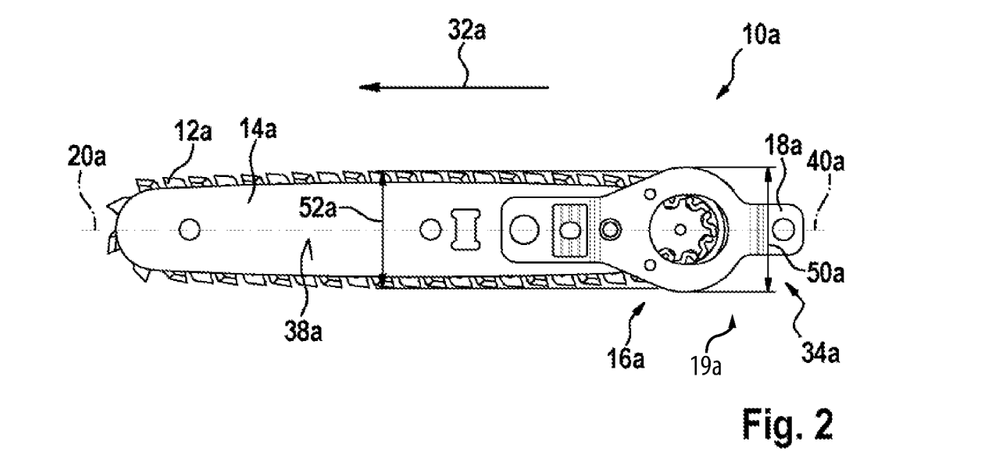

FIG. 2 shows the power-tool parting device 10a having been decoupled from the coupling device 24a of the portable power tool 22a. The power-tool parting device 10a has the cutting strand 12a and the guide unit 14a, which together form a closed system. The cutting strand 12a is guided by means of the guide unit 14a. For this purpose, the guide unit 14a has at least one guide element, realized as a guide groove (not represented in greater detail here), by means of which the cutting strand 12a is guided. The cutting strand 12a in this case is guided by means of edge regions of the guide unit 14a that delimit the guide groove. It is also conceivable, however, for the guide element to be realized in a different manner, considered appropriate by persons skilled in the art, such as, for example, as a rib-type formation on the guide unit 14a that engages in a recess on the cutting strand 12a. The cutting strand 12a additionally comprises a multiplicity of cutting strand segments, which are connected to each other and form the cutting strand 12a realized as a cutting chain.

The power-tool parting device 10a has at least one coding unit 16a, which comprises at least one coding element 18a provided to code at least one coupling interface 19a of the guide unit 14a. The coding unit 16a may also have a multiplicity of coding elements 18a, disposed in an evenly and/or unevenly distributed manner on the guide unit 14a. The coding unit 16a is fixed to the guide unit 14a in a form-closed and/or force-closed manner. The coding unit 16a in this case is fixed to an outer face 38a of the guide unit 14a in a form-closed and/or force-closed manner. Thus, at least the coding element 18a is fixed to the guide unit 14a in a form-closed and/or force-closed manner. The coding element 18a in this case is fixed to the outer face 38a of the guide unit 14a in a form-closed and/or force-closed manner. Moreover, the coding unit 16a comprises at least one chip discharge opening (not represented in greater detail here), which enables chips to be ejected while work is being performed on a workpiece, when the power-tool parting device 10a is being driven. It is also conceivable, however, for the coding unit 16a to be integrally formed on to the guide unit 14a. Moreover, the coding unit 16a is disposed in the region of a drive side 34a of the guide unit 14a. When the power-tool parting device 10a has been coupled to the coupling device 24a, the drive side 34a is disposed in the coupling device 24a. The torque transmission element of the transmission unit 30a in this case engages in the guide unit 14a, in the region of the drive side 34a. Moreover, when the power-tool parting device 10a has been coupled to the coupling device 24a, the torque transmission element of the transmission unit 30a engages in the cutting strand 12a.

The coding element 18a is realized as a longitudinal extension. The coding element 18a in this case, at least in a partial region of the coding element 18a, as viewed in a cutting plane of the cutting strand 12a, has a square shape. It is also conceivable, however, for the coding element 18a, at least in a partial region of the coding element 18a, as viewed in the cutting plane of the cutting strand 12a, to have another shape, considered appropriate by persons skilled in the art, such as, for example, an elliptical shape, a circle-segment shape, etc. Moreover, for the purpose of coding the coupling interface 19a, the coding element 18a extends at least substantially parallelwise in relation to the cutting plane of the cutting strand 12a. The coding element 18a in this case, as viewed in the cutting plane of the cutting strand 12a, projects axially beyond the guide unit 14a. The guide unit 14a has a central axis 20a, in relation to which the guide unit 14a is at least substantially symmetrical. The coding element 18a extends axially beyond the guide unit 14a, along a direction that is at least substantially parallel to the central axis 20a of the guide unit 14a. In addition, the coding element 18a is axially symmetrical in respect of the central axis 20a of the guide unit 14a. A longitudinal axis 40a of the coding element 18a is coaxial with the central axis 20a of the guide unit 14a. The longitudinal axis 40a of the coding element 18a thus forms an axis of symmetry of the coding element 18a. It is also conceivable, however, for the coding element 18a to be asymmetrical in relation to the longitudinal axis 40a of the coding element 18a.

In addition, the coding element 18a, at least in a partial region, as viewed along a direction that is at least substantially parallel to a cutting plane of the cutting strand 12a, has a greater maximum width extent 50a than a maximum width extent 52a of the guide unit 14a and/or of the cutting strand 12a. The coding element 18a has a maximum width extent 50a that is greater than a maximum width extent 52a of the cutting strand 12a together with the guide unit 14a. The cutting strand 12a in this case is mounted on the guide unit 14a. Moreover, the square partial region of the coding element 18a has a lesser width extent than the maximum width extent 50a of the coding element 18a. Moreover, it is conceivable that, on the square partial region of the coding element 18a that extends axially beyond the guide unit 14a, recesses or extensions enabling additional coding and/or torque support are disposed on a circumference of the square partial region of the coding element 18a.

Upon coupling of the power-tool parting device 10a to the coupling device 24a, the coding element 18a acts in combination with a coding recess (not represented in greater detail here) of the coupling device 24a. The coding recess in this case is realized so as to correspond to the coding element 18a. When the power-tool parting device 10a has been coupled to the coupling device 24a, the coding element 18a and the coding recess form a form-closed connection that, in addition to coding of the coupling interface 19a acts as a torque support when work is being performed on a workpiece (not represented in greater detail here) by means of the power-tool parting device 10a and the portable power tool 22a. Coupling of the power-tool parting device 10a to a coupling device that is separate from a coding recess is prevented by means of the coding unit 16a.

Alternative exemplary embodiments are represented in FIGS. 3 to 7. Components, features and functions that remain substantially the same are denoted basically by the same references. To differentiate the exemplary embodiments, the letters a to f have been appended to the references of the exemplary embodiments. The following description is limited substantially to the differences as compared with the first exemplary embodiment described in FIGS. 1 and 2, and reference may be made to the description of the first exemplary embodiment in FIGS. 1 and 2 in respect of components, features and functions that remain the same.

Figure 3:
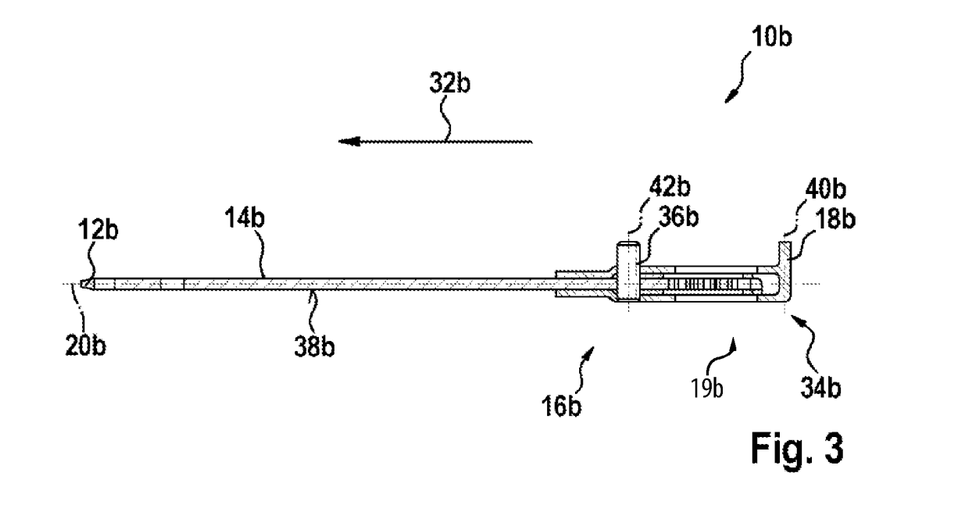

FIG. 3 shows an alternative power-tool parting device 10b, which has at least one cutting strand 12b and at least one guide unit 14b for guiding the cutting strand 12b. The cutting strand 12b and the guide unit 14b together form a closed system. The power-tool parting device 10b additionally comprises at least one coding unit 16b, which has at least one coding element 18b provided to code at least one coupling interface 19b of the guide unit 14b. For the purpose of coding the coupling interface 19b, the coding element 18b extends at least substantially transversely in relation to a cutting plane of the cutting strand 12b. In this case, for the purpose of coding the coupling interface 19b, the coding element 18b extends at least substantially transversely in relation to a cutting plane of the cutting strand 12b. The coding element 18b is thus realized as a transverse extension. The coding element 18b in this case is realized in the shape of a stud. The coding element 18b extends beyond the guide unit 14b, along an at least substantially perpendicular to an outer face 38b of the guide unit 14b. A longitudinal axis 40b of the coding element 18b in this case is at least substantially perpendicular to a central axis 20b of the guide unit 14b.

The coding unit 16b additionally comprises a further coding element 36b. The further coding element 36b is similar in design to the coding element 18b. The further coding element 36b is thus realized as a stud-shaped transverse extension, which extends beyond the guide unit 14b, along the direction that is at least substantially perpendicular to the outer face 38b of the guide unit 14b. A longitudinal axis 42b of the further coding element 36b in this case is at least substantially perpendicular to the central axis 20b of the guide unit 14b. The coding element 18b and the further coding element 36b are disposed in the region of a drive side 34b on the guide unit 14b. It is also conceivable, however, for the coding unit 16b to have a number of coding elements 18b, 36b other than two.

Upon coupling of the power-tool parting device 10b to a coupling device of a portable power tool (not represented in greater detail here), the coding element 18b and the further coding element 36b each act in combination with a coding recess (not represented in greater detail here) of the coupling device. The coding recesses in this case are realized so as to correspond to the coding element 18b and the further coding element 36b.

Figure 4:
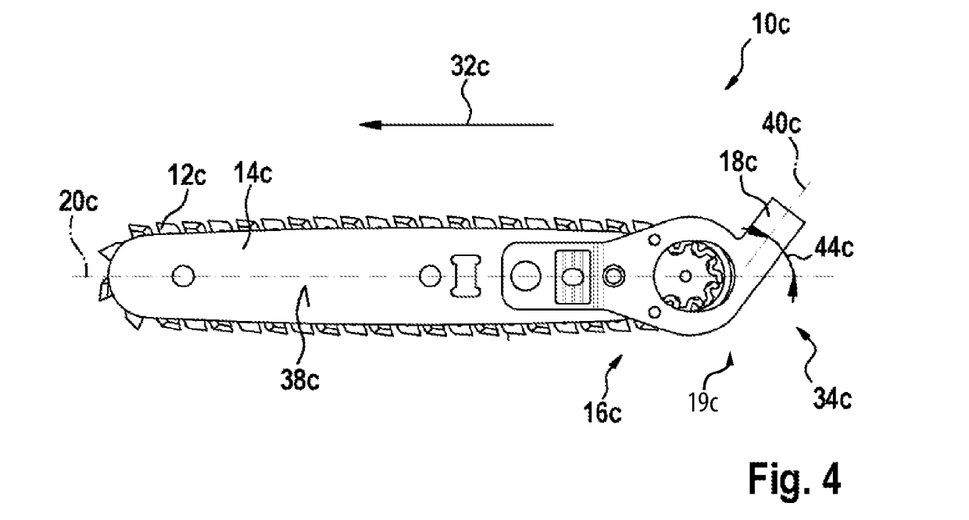

FIG. 4 shows a further, alternative power-tool parting device 10c, which has at least one cutting strand 12c and at least one guide unit 14c for guiding the cutting strand 12c. The cutting strand 12c and the guide unit 14c together form a closed system. The power-tool parting device 10c additionally comprises at least one coding unit 16c, which has at least one coding element 18c provided to code at least one coupling interface 19c of the guide unit 14c. For the purpose of coding the coupling interface 19c, the coding element 18c extends at least substantially parallelwise in relation to a cutting plane of the cutting strand 12c. In this case, the coding element 18c, as viewed in the cutting plane of the cutting strand 12c, projects axially beyond the guide unit 14c. Moreover, the coding element 18c, as viewed in the cutting plane of the cutting strand 12c, extends at least substantially transversely in relation to a central axis 20c of the guide unit 14c. A longitudinal axis 40c of the coding element 18c and the central axis 20c of the guide unit 14c thus enclose an angle 44c that is other than 180° and integral multiples of 180°. It is also conceivable, however, for the central axis 40c of the coding element 18c to be disposed such that it is offset at least substantially parallelwise in relation to the central axis 20c of the guide unit 14c (not represented in greater detail here). In this case, the coding element 18c forms an eccentrically disposed extension that, as viewed in the cutting plane of the cutting strand 12c, extends axially beyond the guide unit 14c, at least substantially parallelwise in relation to the central axis 20c of the guide unit 14c.

Figure 5:
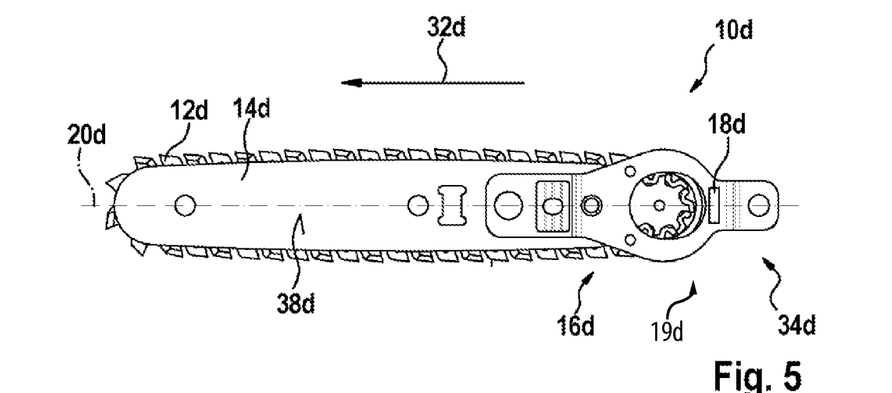

FIG. 5 shows a further, alternative power-tool parting device 10d, which has at least one cutting strand 12d and at least one guide unit 14d for guiding the cutting strand 12d. The cutting strand 12d and the guide unit 14d together form a closed system. The power-tool parting device 10d additionally comprises at least one coding unit 16d, which has at least one coding element 18d provided to code at least one coupling interface 19d of the guide unit 14d. The coding unit 16d has at least one electronic code transmission unit. The coding element 18d in this case is realized as an RFID chip. Electronic coding of the coupling interface 19d of the guide unit 14d can thus be achieved by means of the coding unit 16d.

Figure 6:
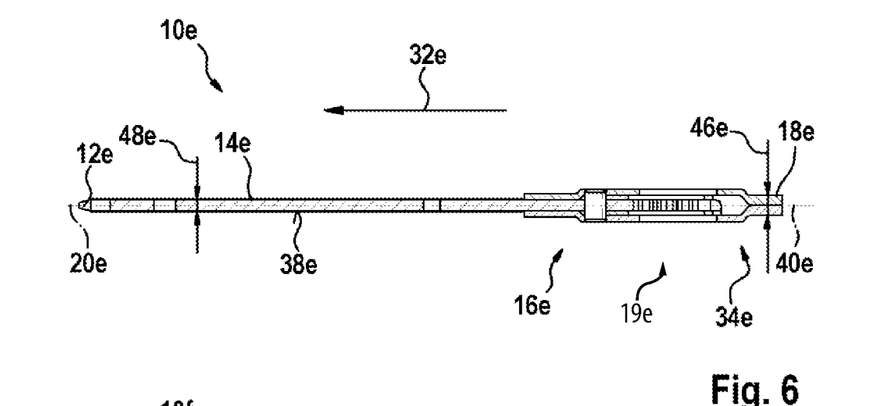

FIG. 6 shows a further, alternative power-tool parting device 10e, which has at least one cutting strand 12e and at least one guide unit 14e for guiding the cutting strand 12e. The cutting strand 12e and the guide unit 14e together form a closed system. The power-tool parting device 10e additionally comprises at least one coding unit 16e, which has at least one coding element 18e provided to code at least one coupling interface 19e of the guide unit 14e. The coding element 18e in this case is realized as an extension that, at least in a partial region, as viewed along a direction that is at least substantially perpendicular to a cutting plane of the cutting strand 12e, has a greater maximum thickness extent 46e than a maximum thickness extent 48e of the guide unit 14e and/or of the cutting strand 12e. The coding unit 16e, as viewed along a direction that is at least substantially perpendicular to the cutting plane of the cutting strand, thus has a greater maximum thickness extent 46e than the maximum thickness extent 48e of the guide unit 14e and/or of the cutting strand 12e. The coding element 18e is realized as a longitudinal extension. In this case, the coding element 18e is fixed to an outer face 38e of the guide unit 14e. The coding element 18e in this case, as viewed in the cutting plane of the cutting strand 12e, projects axially beyond the guide unit 14e.

Figure 7:
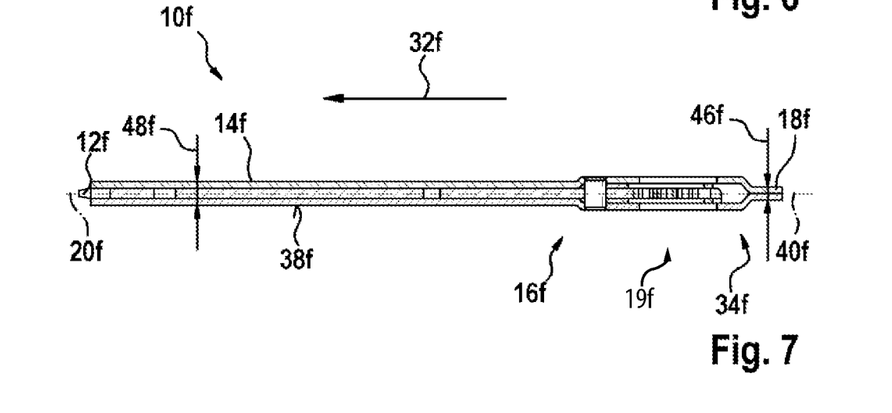

FIG. 7 shows a further, alternative power-tool parting device 10f, which has at least one cutting strand 12f and at least one guide unit 14f for guiding the cutting strand 12f The cutting strand 12f and the guide unit 14f together form a closed system. The power-tool parting device 10f additionally comprises at least one coding unit 16f, which has at least one coding element 18f provided to code at least one coupling interface 19f of the guide unit 14f The coding element 18f is realized as an extension that, at least in a partial region, as viewed along a direction that is at least substantially perpendicular to a cutting plane of the cutting strand 12f, has a lesser maximum thickness extent 46f than a maximum thickness extent 48f of the guide unit 14f and/or of the cutting strand 12f. The coding element 18f is thus realized as a longitudinal extension. In this case, the coding element 18f, as viewed in the cutting plane of the cutting strand 12f, projects axially beyond the guide unit 14f. In an alternative design of the power-tool parting device 10f that is not represented in greater detail here, it is conceivable for the coding element 18f, as viewed along a direction that is at least substantially parallel to a central axis 20f of the guide unit 14f, to have alternately a lesser maximum thickness extent 46f and a greater maximum thickness extent than a maximum thickness extent 48f of the guide unit 14f and/or of the cutting strand 12f.

The invention claimed is:

1. A power tool system, comprising:
   at least one power-tool parting device including:
      at least one cutting strand;
      at least one guide unit configured to guide the cutting strand and including at least one coupling interface; and at least one coding unit including at least one coding element configured to code the at least one coupling interface of the guide unit; and a portable power tool configured to at least one of form-close couple and force-close couple to the at least one power-tool parting device, wherein the coding element includes an RFID chip.

2. A portable power tool comprising:

a coupling device configured to at least one of form-close couple and force-close couple to a power-tool parting device, said parting device including:

at least one cutting strand;

at least one guide unit configured to guide the cutting strand and including at least one coupling interface; and     at least one coding unit including at least one coding element configured to code the at least one coupling interface of the guide unit, wherein the coding element includes an RFID chip.

3. A power-tool parting device, comprising:

at least one cutting strand;

at least one guide unit configured to guide the cutting strand and including at least one coupling interface; and at least one coding unit including, at least one coding element configured to code the at least one coupling interface of the guide unit, wherein the coding element includes an RFID chip.

4. The power-tool parting device as claimed in claim 3, wherein, to enable coding the at least one coupling interface, the coding element further includes an extension extending substantially parallelwise in relation to a cutting plane of the cutting strand.

5. The power-tool parting device as claimed in claim 3, wherein the coding element, as viewed in a cutting plane of the cutting strand, projects axially beyond the guide unit.

6. The power-tool parting device as claimed in claim 3, wherein the coding element, at least in a partial region, as viewed along a direction that is at least substantially parallel to a cutting plane of the cutting strand, has a greater maximum width extent than at least one of:

a maximum width extent of the guide unit; and a maximum width extent of the cutting strand.

7. The power-tool parting device as claimed in claim 3, wherein to enable coding of the at least one coupling interface, the coding element extends at least substantially transversely in relation to a cutting plane of the cutting strand.

8. The power-tool parting device as claimed in claim 3, wherein the coding element includes an extension that, at least in a partial region, as viewed along a direction that is at least substantially perpendicular to a cutting plane of the cutting strand, has a greater maximum thickness extent than at least one of:

a maximum thickness extent of the guide unit; and a maximum thickness extent of the cutting strand.

9. The power-tool parting device as claimed in claim 3, wherein the coding element includes an extension that, at least in a partial region, as viewed along a direction that is at least substantially perpendicular to a cutting plane of the cutting strand, has a lesser maximum thickness extent than at least one of:

the maximum thickness extent of the guide unit; and the maximum thickness extent of the cutting strand.

10. The power-tool parting device as claimed in claim 3, wherein the coding element, as viewed in a cutting plane of the cutting strand, extends at least substantially transversely in relation to a central axis of the guide unit.

\* \* \* \* \*

UNITED STATES PATENT AND TRADEMARK OFFICE
CERTIFICATE OF CORRECTION

PATENT NO. : 9,744,606 B2
APPLICATION NO. : 14/410077
DATED : August 29, 2017
INVENTOR(S) : Engelfried et al.

Page 1 of 1

It is certified that error appears in the above-identified patent and that said Letters Patent is hereby corrected as shown below:

In the Claims

In Column 11, Lines 24-26, Lines 5-7 of Claim 3 should read:
at least one coding unit including at least one coding
    element configured to code the at least one coupling
    interface of the guide unit, Signed and Sealed this
Eighteenth Day of September, 2018

Andrei Iancu
*Director of the United States Patent and Trademark Office*